(12) United States Patent
Chen

(10) Patent No.: US 8,083,345 B2
(45) Date of Patent: Dec. 27, 2011

(54) GLASSES HINGE STRUCTURE

(76) Inventor: Tsung-Wen Chen, Taipei (TW)

(*) Notice: Subject to any disclaimer, the term of this patent is extended or adjusted under 35 U.S.C. 154(b) by 0 days.

(21) Appl. No.: 12/556,864

(22) Filed: Sep. 10, 2009

(65) Prior Publication Data

US 2010/0321629 A1 Dec. 23, 2010

(30) Foreign Application Priority Data

Jun. 23, 2009 (CN) ...................... 2009 2 0139199 U

(51) Int. Cl.
*G02C 5/22* (2006.01)
(52) U.S. Cl. .......................................... 351/153; 16/228
(58) Field of Classification Search .................. 351/121, 351/153; 16/228
See application file for complete search history.

(56) References Cited

U.S. PATENT DOCUMENTS

| 7,264,349 | B1 * | 9/2007 | Ku | 351/153 |
| 7,712,894 | B2 * | 5/2010 | Tsai | 351/97 |

* cited by examiner

*Primary Examiner* — Huy K Mai

(57) ABSTRACT

A glasses hinge structure includes a pivot and a pivot seat. The pivot seat and the pivot are integrally formed with a corner panel of a glasses frame and a glasses foot, respectively. The pivot has a vertical portion in a cylinder shape and a horizontal connecting portion. The vertical portion has a middle section connected with a front end of the horizontal connecting portion. The horizontal connecting portion has a rear end connected to the glasses foot. The pivot seat has a vertical trough and a recess. The vertical trough is adapted for insertion of the vertical portion of the pivot. The recess is interconnected with a middle section of the vertical trough to accommodate the horizontal connecting portion when the glasses foot is extended. The vertical trough has a C-shaped cross-section which has an opening. The opening is less than a diameter of the vertical portion and greater than a width of the horizontal connecting portion. One end of the vertical trough is formed with a notch for the vertical portion to be inserted therefrom.

2 Claims, 3 Drawing Sheets

US 8,083,345 B2

GLASSES HINGE STRUCTURE

BACKGROUND OF THE INVENTION

1. Field of the Invention

The present invention relates to a glasses hinge, and more particularly to a glasses hinge structure without using a screw to lock a glasses foot.

2. Description of the Prior Art

As shown in FIG. 1, a conventional glasses hinge structure is composed of a pivot seat 30 of a corner panel 10 of a glasses frame, another pivot seat 40 of a glasses foot 20, and a screw 50. It is necessary to use a tool for tightening or loosening the screw 50, which is very inconvenient to assemble, disassemble or displace the glasses. Accordingly, the inventor of the present invention has devoted himself based on his many years of practical experiences to solve this problem.

SUMMARY OF THE INVENTION

The primary object of the present invention is to provide a glasses hinge structure, which doesn't need a screw to lock the glasses hinge, providing a convenient and easy way for assembly, disassembly or displacement.

According to the present invention, there is provided a glasses hinge structure, comprising a pivot and a pivot seat, the pivot seat and the pivot being integrally formed with a corner panel of a glasses frame and a glasses foot, respectively; the pivot having a vertical portion in a cylinder shape and a horizontal connecting portion, the vertical portion having a middle section connected with a front end of the horizontal connecting portion, the horizontal connecting portion having a rear end connected to the glasses foot; the pivot seat having a vertical trough and a recess, the vertical trough being adapted for insertion of the vertical portion of the pivot, the recess being interconnected with a middle section of the vertical trough to accommodate the horizontal connecting portion when the glasses foot is extended, the vertical trough having a C-shaped cross-section which has an opening, the opening being less than a diameter of the vertical portion and greater than a width of the horizontal connecting portion, one end of the vertical trough being formed with a notch for the vertical portion to be inserted therefrom.

Preferably, the pivot seat is integrally formed with the corner panel of the glasses frame, the pivot is integrally formed with the glasses foot, and the opening of the vertical trough is disposed at a corner of the corner panel of the glasses frame.

The pivot seat and the pivot of the present invention are integrally formed with the cornel panel of the glasses frame and the glasses foot, respectively, through a mold, which is manufactured with ease. To assemble the present invention, the vertical portion of the pivot is inserted into the vertical trough of the pivot seat, so that the glasses foot and the cornel panel of the glasses frame are hinged together with the pivot seat and the pivot. To disassemble the present invention, the vertical portion of the pivot is retreated from the vertical trough of the pivot seat. It is not necessary to use a tool to assemble, disassemble or replace the glasses, without a screw for connection. This is convenient for a user to replace a desired glasses foot so as to match a different hair style or clothing.

DETAILED DESCRIPTION OF THE PREFERRED EMBODIMENTS

Embodiments of the present invention will now be described, by way of example only, with reference to the accompanying drawings.

Figure 1:
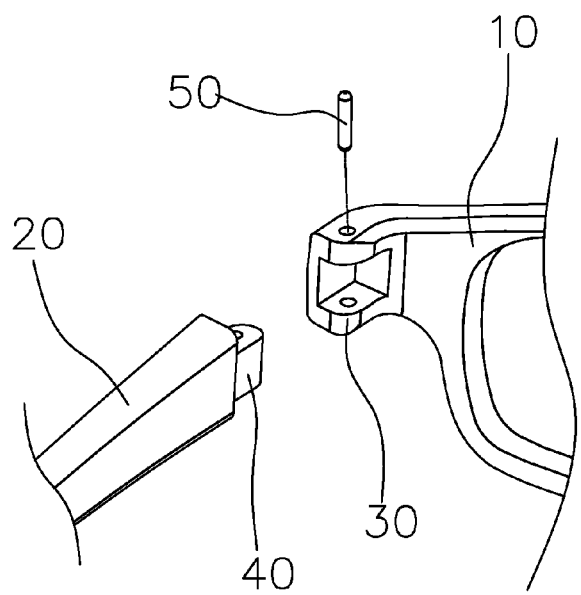
FIG. 1 is an exploded view of a conventional glasses hinge structure.
Figure 2:
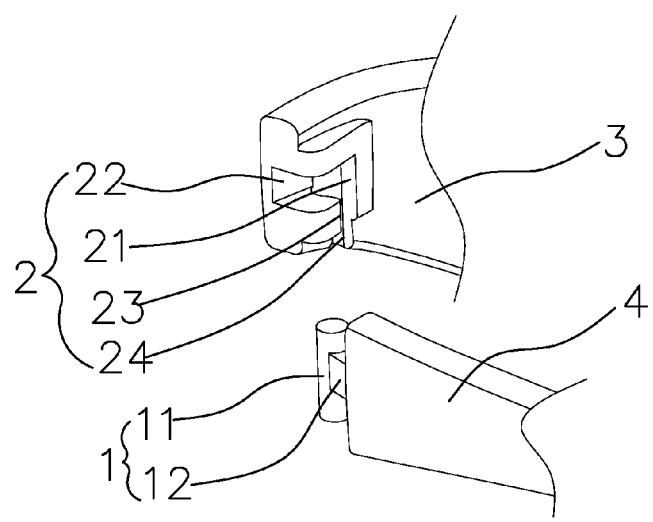
FIG. 2 is an exploded view according to a preferred embodiment of the present invention.

As shown in FIG. 2, a glasses hinge structure according to a preferred embodiment of the present invention comprises a pivot 1 and a pivot seat 2. The pivot seat 2 and the pivot 1 are integrally formed with a corner panel 3 of a glasses frame and a glasses foot 4, respectively. In the embodiment, the pivot 1 is integrally formed with the glasses foot 4. The pivot 1 has a vertical portion 11 in a cylinder shape and a horizontal connecting portion 12. The vertical portion 11 has a middle section connected with a front end of the horizontal connecting portion 12. The horizontal connecting portion 12 has a rear end connected to the glasses foot 4.

The pivot seat 2 is integrally formed with the corner panel 3 of the glasses frame. The pivot seat 2 has a vertical trough 21 and a recess 22. The vertical trough 21 is adapted for insertion of the vertical portion 11 of the pivot 1. The recess 22 is interconnected with a middle section of the vertical trough 21 to accommodate the horizontal connecting portion 12 when the glasses foot 4 is extended. The vertical trough 21 has a C-shaped cross-section which has an opening 23. The opening 23 is less than the diameter of the vertical portion 11 and greater than the width of the horizontal connecting portion 12, so that the pivot 1 is unable to disengage from the pivot seat 2 in a horizontal direction after the pivot seat 2 and the pivot 1 are coupled together. One end of the vertical trough 21 is formed with a notch 24 for the vertical portion 11 to be inserted therefrom.

Figure 5:
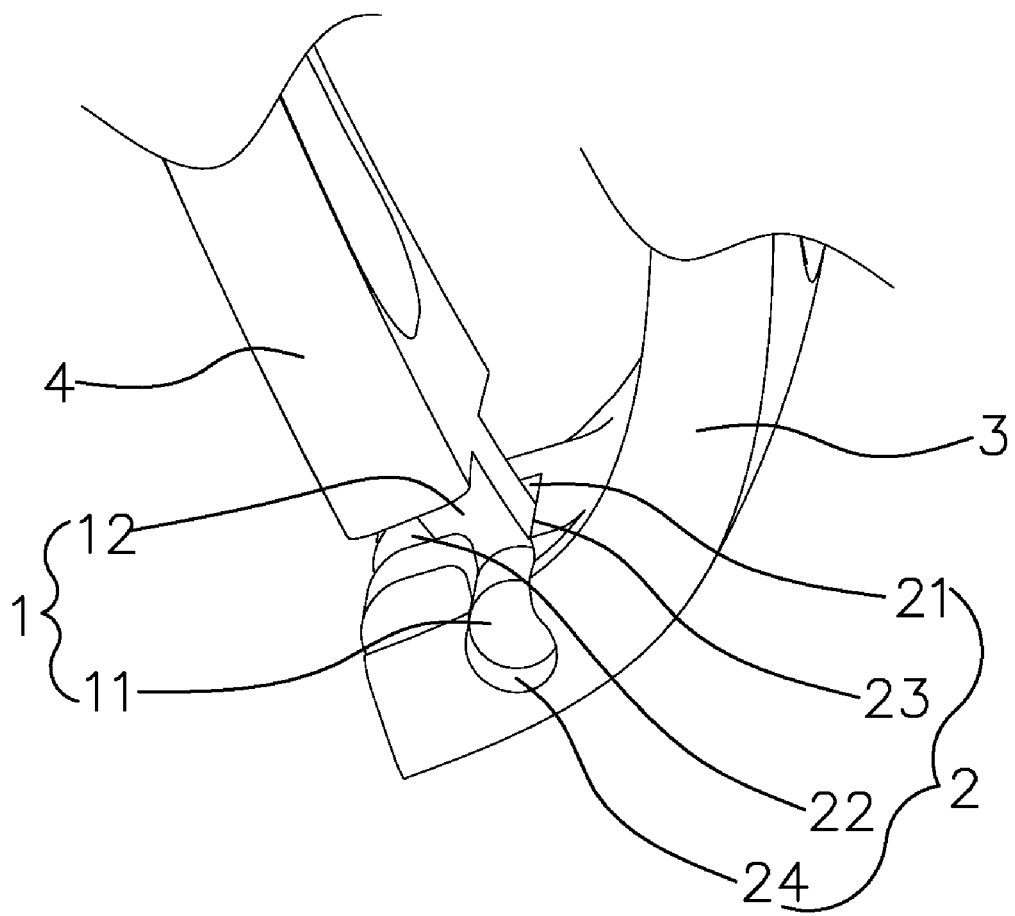
FIG. 5 is a schematic view according to the preferred embodiment of the present invention in a folded status.

In order to prevent the pivot 1 from disengaging from the pivot seat 2, in this embodiment the opening 23 of the vertical trough 21 is disposed at the corner of the corner panel 3 of the glasses frame such that the horizontal connecting portion 12 and the opening 23 are in different positions when the glasses foot 4 is folded. As shown in FIG. 5, it is difficult to have the glasses foot 4 lean against the glasses frame fully without a special external force. Accordingly, the pivot 1 is unable to disengage from the pivot seat 2 along an axial direction for securing the connection of the glasses hinge firmly.

Alternatively, the pivot seat 2 is integrally formed with the glasses foot 4 and the pivot 1 is integrally formed with the corner panel 3 of the glasses frame, which has the same effect.

Figure 3:
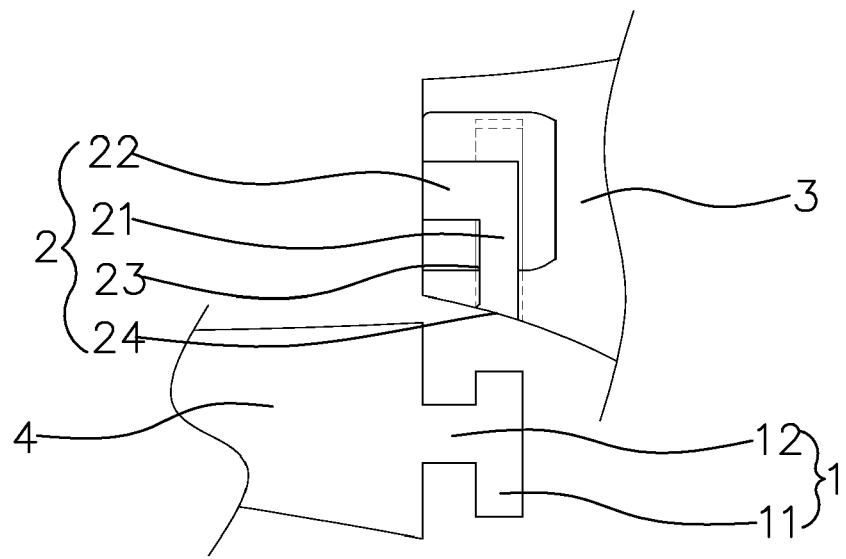
FIG. 3 is a plane view according to the preferred embodiment of the present invention.
Figure 4:
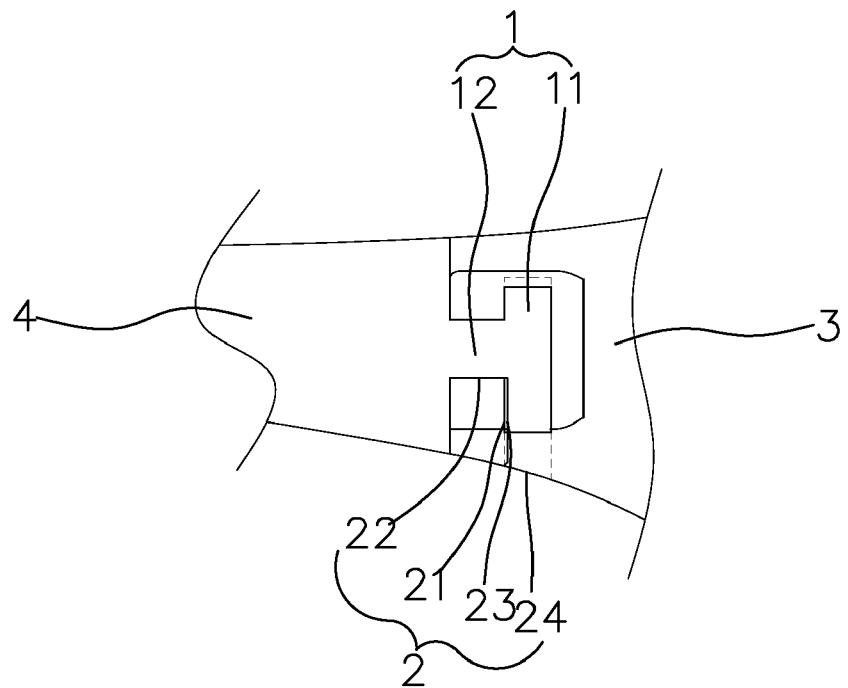
FIG. 4 is an assembled plane view according to the preferred embodiment of the present invention.

To assemble the present invention, as shown in FIGS. 3 and 4, the vertical portion 11 of the pivot 1 is aligned with the notch 24 of the vertical trough 21 of the pivot seat 2, the horizontal connecting portion 12 is aligned with the opening 23 of the vertical trough 21 of the pivot seat 2, and the vertical portion 11 is inserted into the vertical trough 21, so that the glasses foot 4 and the cornel panel 3 of the glasses frame are hinged together with the pivot seat 2 and the pivot 1. To disassemble the present invention, the glasses foot 4 is pressed to align the horizontal connecting portion 12 with the opening 23 so that the vertical portion 11 is retreated from the vertical trough 21.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A glasses hinge structure, comprising a pivot and a pivot seat, the pivot seat and the pivot being integrally formed with a corner panel of a glasses frame and a glasses foot, respectively; the pivot having a vertical portion in a cylinder shape with a diameter and a horizontal connecting portion, the vertical portion having a middle section connected with a front end of the horizontal connecting portion, the horizontal connecting portion having a rear end connected to the glasses foot; the pivot seat having a vertical trough and a recess, a bottom end of the vertical trough being adapted for a bottom-up vertical insertion of the vertical portion of the pivot, the recess being interconnected with a middle section of the vertical trough for accommodating the horizontal connecting portion when the glasses foot is extended, the vertical trough having a C-shaped cross-section which has an opening; the opening being less than the diameter of the vertical portion for disallowing any other ways of insertion of the vertical portion, and the opening being greater than a width of the horizontal connecting portion, while the bottom end of the vertical trough being formed with a bottom notch extended horizontally to ground level and outwardly in a direction perpendicular to the vertical trough for defining an openness confined by an inner wall connected to a bottom surface of the recess; wherein, to disassemble the hinge structure, the glasses foot is pressed to align the horizontal connecting portion with the opening so that the vertical portion is retreated from the vertical trough.

2. The glasses hinge structure as claimed in claim 1, wherein the pivot seat is integrally formed with the corner panel of the glasses frame, the pivot is integrally formed with the glasses foot, and the opening of the vertical trough is disposed at a corner of the corner panel of the glasses frame.

* * * * *